Patented June 16, 1953

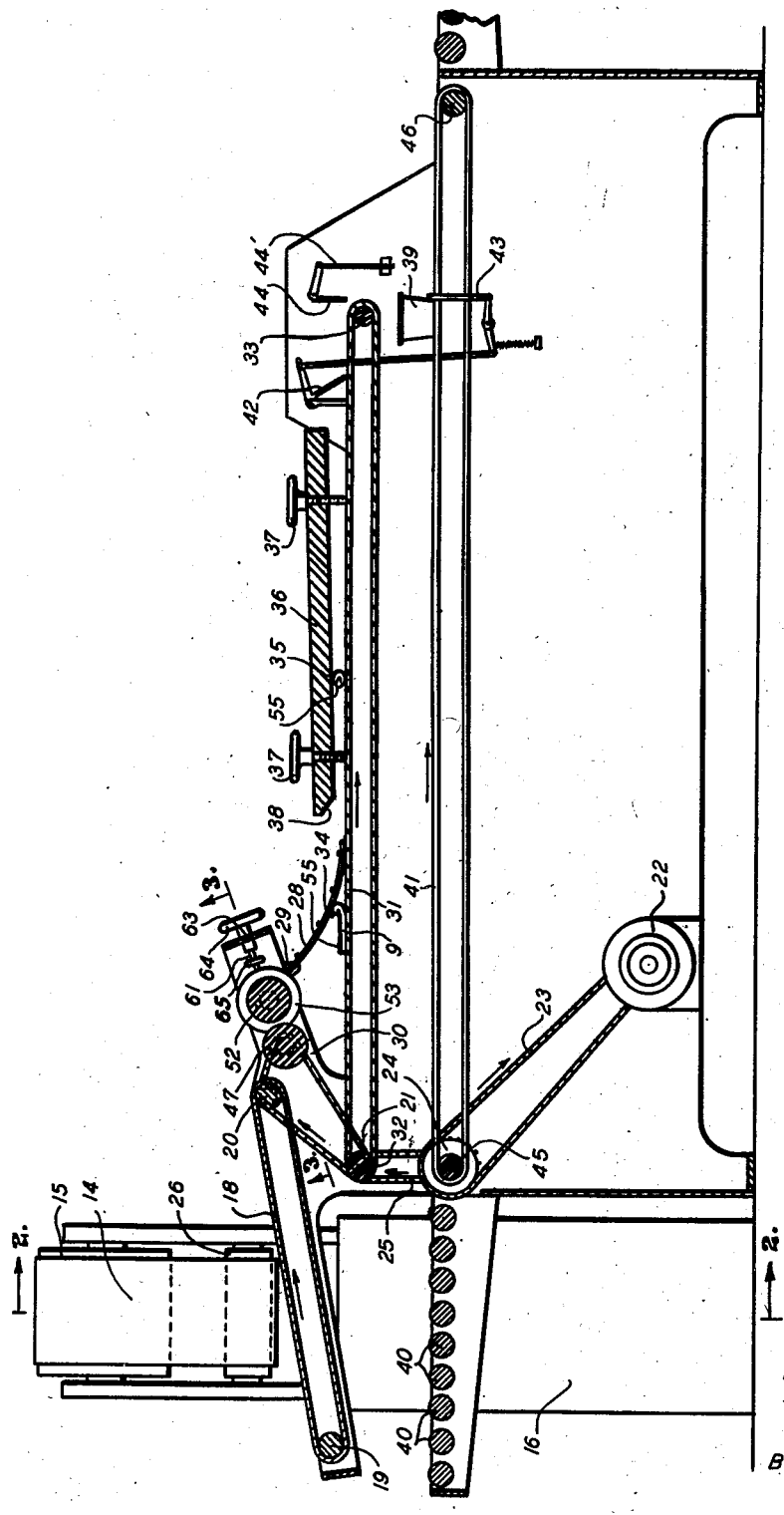

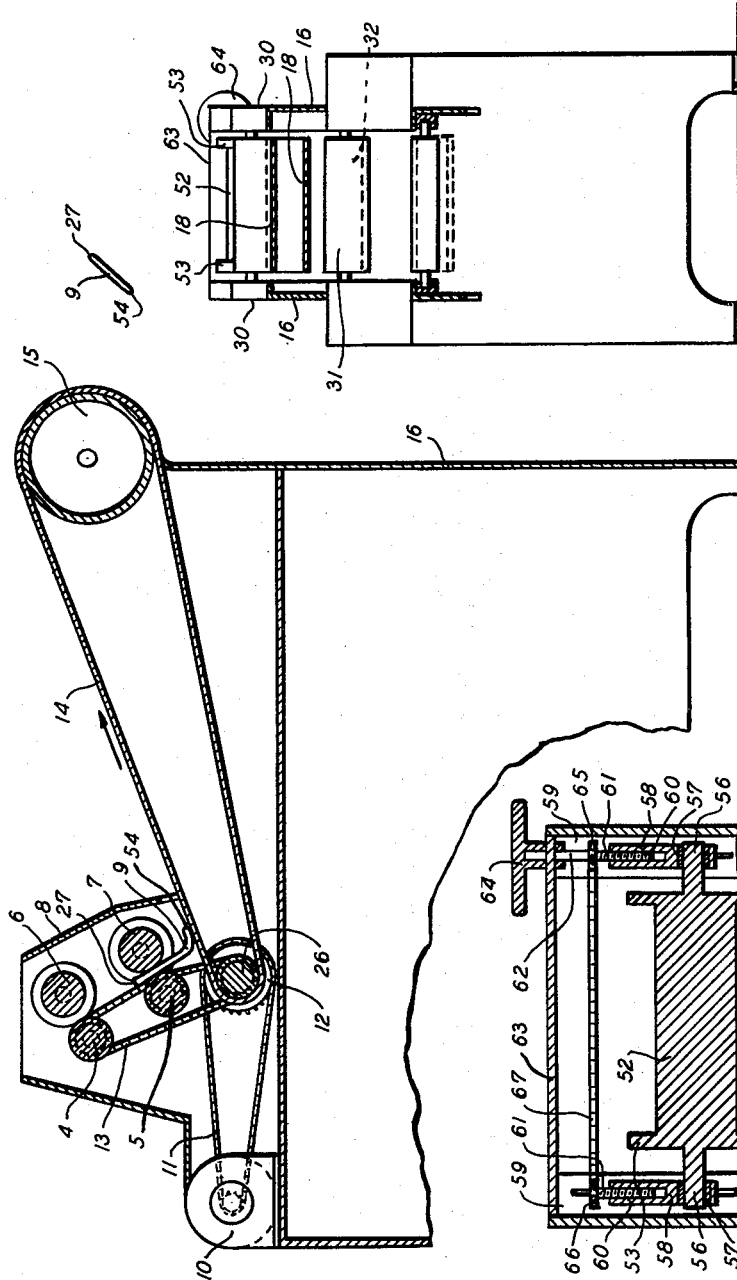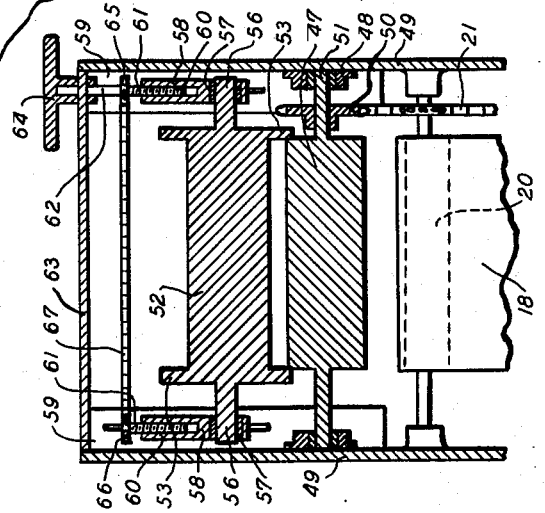

2,642,012

UNITED STATES PATENT OFFICE 2,642,012

DOUGH SHEETING DEVICE FOR TRANSVERSE SHEETING

Merlin A. Sticelber, Kansas City, Mo., assignor to Stickelber & Sons, Inc., a corporation of Missouri Application October 25, 1947, Serial No. 782,142

3 Claims. (Cl. 107—9)

My invention relates to dough sheeting devices, and more particularly to a dough sheeting device for transversely sheeting dough.

It is a particular purpose of my invention to provide means for sheeting dough, which involves means for first sheeting the dough in one direction and then sheeting the dough transversely of the first sheeting action.

In dough molding machines, such as loaf molding machines, pieces of dough are first sheeted and then curled up on themselves to form the loaf, and after the loaf has been formed it is usually deposited in a pan by automatic panning means. In the ordinary molding machine the piece of dough, which has a thin dry skin coat thereon, and a moist interior, is passed between rollers in only one direction and as a result the moist dough on the inside of the dough piece is pressed to the surface thereof except at the forward end edge thereof. The dry surfaced forward end edge will be in the center of the loaf and this dryness causes the development of holes and white spots in the baked load.

It is a purpose of my invention to provide a sheeting means for dough pieces, which serves to squeeze the moisture in the dough piece to the surface thereof to provide a moist surface at the rear or sealing end edge of the piece when it is curled or rolled up and yet not have the forward end edge dry on its surface either. This is accomplished by passing the dough piece after it has been sheeted in one direction through rollers that sheet it in a direction transverse to the first direction of sheeting.

It is a further purpose of my invention to provide such a sheeting means for transversely sheeting the piece of dough between the first sheeting means and the curling means and to provide a sheeting means at this location that will properly locate and size the piece of dough so that it will be deposited on the conveyor that feeds the same into the curling mechanism in a proper position that it will align with the pan to which the particular dough piece is fed on the panning device, which is usually although not necessarily, a part of the molding machine.

A molding machine, such as that to which my invention is adapted to be applied, usually comprises a curling device including a pressure board to which the conveyor feeds the sheeted pieces of dough. It is necessary that the pieces of dough be exactly in the right position relative to the pressure board as well as the panning device, and my improved dough sheeting means provide for the proper positioning of the dough piece of proper width so that it will be curled and formed into a loaf and be fed to a pan in such a way that the pan will receive it without any of the loaf overlapping any of the end portions of the pan.

Other objects and advantages of my invention will appear as the description of the drawings proceeds. I desire to have it understood, however, that I do not intend to limit myself to the particular details shown or described, except as defined in the claims.

In the drawings:

Fig. 1 is a view partly in elevation and partly in longitudinal section through a loaf molding and panning machine, showing my invention applied thereto.

Fig. 2 is a section taken on the line 2—2 of Fig. 1, and

Fig. 3 is a section taken on the line 3—3 of Fig. 1.

Referring in detail to the drawings, the molding machine that incorporates my dough sheeting means has a sheeting device to which pieces of dough are fed, comprising the sheeting rollers 4, 5, 6 and 7, the rollers 4 and 5 being plain cylindrical rollers and the rollers 6 and 7 being flanged. Said rollers are mounted in a suitable housing 8 and the pieces of dough 9 that pass between said rollers are molded or sheeted into a flattened form as shown in Fig. 2. The rollers are driven in any suitable manner, as from a motor 10, which drives a sprocket chain 11 operating over a sprocket wheel 12 that is mounted on a shaft having a sprocket fixed thereto over which a sprocket chain 13 operates, that also operates over sprockets fixed on shafts carrying the rollers 4 and 5. The rollers 6 and 7 are driven by means of the rollers 4 and 5 being free to roll on their shafts.

A conveyor comprising the belt 14 receives the sheeted pieces of dough 9, said belt moving in the direction indicated by the arrow in Fig. 2 to carry the sheeted pieces of dough over the large roller 15, pieces of sheeted dough 9 passing over the roller 15 on the conveyor belt so as to be discharged and turned over so that the side that was bottommost on the belt 14 will be uppermost by the time the dough reaches the position shown at the right of the roller 15 in Fig. 2. The above described parts, which are common in bread molding machines of the character to which my invention is applied, are mounted on a suitable frame 16 and a frame 17 is provided that extends in a direction that is transverse to the direction of travel of the conveyor 14 or transverse to the direction in which said piece of dough 9 has been rolled out by the sheeting rollers 4, 5, 6 and 7.

Said frame 17 is provided with a plurality of conveyors comprising the belt conveyor 18, which operates in the direction indicated by the arrow in Fig. 1, operating over the rollers 19 and 20, said roller 20 being driven by means of a sprocket chain 21, which is driven from a motor 22 that is mounted on the frame 17. Said motor 22 drives a sprocket chain 23 that operates over a sprocket 24, which is mounted on a shaft that also has a sprocket thereon that drives the sprocket chain 25, which in turn drives a shaft on which a sprocket is fixed that drives the chain 21, the sprocket chains being driven in the direction indicated by the arrows in Fig. 1. The conveyor 18 receives the pieces of dough 9 that have been sheeted and carries them away from the sheeting mechanism that has produced the sheeted piece of dough 9 in a direction transverse to that in which the sheeting action has taken place, or in which the pieces of dough 9 have been rolled out into a sheeted form. The conveyor 14 operates over a roller 26 that is driven by the sprocket chain 11, being fixed on the shaft carrying the sprocket 12.

The pieces of dough that are on the conveyor belt 18 traveling toward the upper end thereof where the same passes around the roller 20 are in such position after having turned over and having been received by said belt 18 that the edge 27 of said pieces, which was rearmost after having been sheeted by the rollers 4 and 6, and 5 and 7, is substantially parallel to one of the side edges of the conveyor belt 18, as will be obvious from Fig. 2. There is nothing, however, to assure the specific location of the pieces of dough 9 on the belt 18 because the same drop freely from the belt 14, where it passes over the roll 15, onto the belt 18. In order to make a loaf or loaf-like member, such as a loaf of bread, out of the piece of dough, it has to be rolled up or curled up on itself. For this purpose curling mechanism is provided, which comprises a flexible chain mesh member 28 that depends from a bracket 29 on the extension 30 of the frame 17, and which engages a conveyor belt 31, which moves in the direction indicated by the arrow in Fig. 1, being mounted to pass over rollers 32 and 33, said roller 32 being a driven roller driven by a sprocket over which the chain 25 operates. The flexible chain mesh member 28 dragging on the conveyor belt causes the forward edge 34 of the piece of dough 9 traveling along with the belt 31 to be turned back on itself. Then the piece of dough passes under the pressure board 36 and is curled up on itself and the curled-up piece 35 is pressed together so as to seal the adjacent turns of dough to the next turn and thus hold the curled-up piece together in loaf-like form.

Suitable adjusting means 37 are provided for the pressure board and this pressure board may be of any desired material or character, ordinarily having a tapered forward end 38 to direct the pieces of dough under the pressure board. The pieces of dough that are being carried along by the conveyor belt 31, after being engaged by the flexible member 28 and the pressure board 36, usually pass to a panning device, the panning device being of a character to place the pans 39 in a suitable position to receive the formed loaves 35.

The panning device comprises a pan feeding means consisting of a plurality of conveyor rollers 40, over which the pans are fed in any suitable manner to the conveyor 41, which usually comprises a pair of spaced belts driven in the direction indicated by the arrow in Fig. 1 by means of the chain 23 operating over the sprocket 24. The details of construction of the panning device are of no particular importance to my invention, except that the panning device is actuated by means of the loaves 35 that are passing along the conveyor 31 by engagement with a suitable actuating member 42, which releases suitable holding mechanism 43 extending between said belts to permit a pan 39 to move into proper position to receive a molded loaf, and which is provided with suitable means, such as the stiff flexible member 44, for straightening the dough piece on the belt so that it extends parallel to the pan 39 when it drops into the same, said member 44 being held in loaf engaging position by a spring 44'.

As the rolled-up pieces of dough 35 forming the loaves are of a length closely approaching the length of the pans, it is highly important that the pieces of dough that have been curled up are in the right position on the conveyor belt 31 transversely thereof that the same will properly align with the pans on the conveyor 41. The conveyor 41 operates in a straight line over the driven roller 45 and the idler roller 46, and any suitable means may be provided for centering the pans properly on the conveyor 41, this being common to apparatus of this character, not being part of my invention.

It is also important that the pieces of dough that are curled by means of the member 28 are fed in proper alignment with the pressure board and that the same engage the pressure board exactly at the same location transversely of the board so that said pressure board will act over the whole length of the curled-up pieces of dough and so that the pieces of dough that have been rolled up on themselves and formed into a loaf by the combined action of the flexible member 28 and the pressure board 36 will be in the proper position on the conveyor 31 transversely of said conveyor belt to feed into the pans 39 accurately and prevent any overlap of the loaf beyond either end of the pan, which would make it necessary to straighten out the loaf in the pan in order that a perfect loaf of bread will be formed in the pan during the proofing operation.

My improved transverse sheeting means that forms a part of the machine illustrated in the drawings and is the principal feature of my invention, is provided to not only transversely sheet the dough piece, but to definitely locate the piece of dough relative to the flexible means 28, the pressure board 36 and the panning device. Said sheeting means comprises a driven plain cylindrical roller 47, which is mounted in suitable bearings 48 on the side members 49 of the extension 30 of the frame 17, a sprocket 50 being fixed on the shaft 51 extending from and rotating with the roller 47, over which the sprocket chain 21 operates to drive said roller 47 in a clockwise direction as viewed in Fig. 1. The sheeting roller 47 has a sheeting roller 52 cooperating therewith, which is provided with marginal flanges 53 between which the roller 47 fits as shown in Fig. 3. The roller 47 will receive the pieces of dough 9 that have passed onto the conveyor 18 and will convey said pieces of dough in the general direction in which they have been traveling on the conveyor 18 and into engagement with the roller 52, the rollers 47 and 52 cooperating to transversely sheet the dough or roll it out in a direction transverse to the direction in which it was sheeted or rolled out by the sheeting mechanism comprising the rollers 4 and 6, and 5 and 7.

When the pieces of dough were sheeted by said sheeting means comprising the rollers 4, 6, 5 and 7 the cells formed in proofing the rounded pieces of dough are broken down and the moist dough on the inside of the dough piece was squeezed outwardly to the surface thereof except at the forward end edge 54 thereof. The piece of dough 9 accordingly, when it is on the conveyor 18, has one edge 27 that is located substantially parallel to one side edge of the conveyor 18 that will be moist on its surface and a side edge 54 thereof that is substantially parallel to the side edge of the conveyor belt 18 that is dry on its surface. However, after the rollers 52 and 47 are engaged by said piece of dough, the moist dough on the inside of the piece will be squeezed outwardly at both side edges 27 and 54 to the surface and as a result there will be no dry surface remaining on said dough piece at any of the side or end edges thereof. As the moist surfaced end edge 55 is the closing edge when the dough piece has been rolled up as illustrated at 35 in Fig. 1, the pressure board 36 will readily seal the exposed edge 55 of the rolled up piece of dough 35 to the next adjacent layer of the curled up piece. Furthermore, due to the fact that the piece of dough has been rolled first in a manner to cause the moist interior dough in the piece to travel in one direction, and then has been sheeted or rolled in a direction transversely thereto to cause the moist interior dough in the piece to travel in a direction transversely thereto, the entire dough piece will be moist surfaced on both faces and all edges. The loaf that results will have no large holes develop therein during the proofing operation and will be of a much finer more uniform texture than would otherwise be the case. Also there will be no extremely dry portion in the center of the loaf that would cause white lumps or spots in the loaf of bread which did not properly rise during the proofing operation.

Due to the provision of the flanges 53 on the roller 52 the cooperating action of the rollers 47 and 52 is such that the pieces of dough will be re-shaped when they are transversely sheeted by said rollers so that the side edges of said pieces will lie at the flanges 53 and the pieces of dough will be of the exact width of the length of roller lying between said flanges, and when the same leave the curling mechanism and pass to the conveyor belt 31 these pieces of dough will be exactly located relative to the conveyor belt so that their side edges will be spaced a definite distance from the side edges of the conveyor belt 31 and will maintain this position as the dough pieces are curled up on themselves by the combined action of the flexible member 28 and the pressure board 36 and pass to the pans 39 in such a manner as to be definitely located relative to said pans transversely of the conveyor belt 31.

The pieces of dough having been sheeted by the rollers 4, 6, 5 and 7, previously, the action of the rollers 47 and 52 is principally a re-shaping action and the squeezing action of the rollers 47 and 52 is not nearly as great as that of the rollers 4, 6, 5 and 7, because the rollers 4, 6, 5 and 7 have converted the piece of dough from the usual rounded piece that is fed in any suitable manner between the rollers 4 and 6 to a flattened or sheeted piece, whereas when the pieces 9 travel on the conveyor belt 18 to the rollers 47 and 52 these have been flattened or sheeted and only have to be re-shaped slightly to properly locate the same relative to the molding and panning mechanism.

It is necessary that adjusting means be provided for adjusting the spacing of the rollers 52 and 47 so that said rollers will exert exactly the proper sheeting action on the pieces of dough to obtain the uniform width thereof that is desired, determined by the flanges 53. Accordingly the roller 52 is mounted for adjustment relative to the roller 47 by any suitable means, such as that illustrated in Fig. 3 of the drawings. Said roller has shaft portions 56 extending therefrom, which are mounted in suitable bearings 57 in the adjustable bearing brackets 58, which are suitably mounted in slideways 59 in the side members 49 of the frame extension 30, said adjustable members 58 having internally screw-threaded portions 60 that have an adjusting screw 61 engaged therewith. One of the adjusting screws 61 has an extension 62 that is rotatably mounted in the transverse member 63 and has a hand wheel 64 thereon for rotating the same. A sprocket 65 is also provided on said member 61 and a sprocket 66 is provided on the other member 61, a sprocket chain 67 operating over said sprockets 66 and 65 so as to adjust the two adjusting members 61 uniformly upon rotation of the hand wheel 64.

What I claim is:

1. In a bread molding machine, sheeting means, means for curling pieces of sheeted dough on themselves, comprising a conveyor belt, means for conveying said sheeted pieces of dough transversely of their path through said sheeting means, sheeted dough piece feeding means receiving said sheeted dough pieces onto the same from said sheeting means and conveying the same lengthwise of their path through said sheeting means, said feeding means depositing said sheeted dough pieces onto said conveying means crosswise thereof, and sizing means between said conveying means and said conveyor belt for sheeting said pieces of dough transversely of the first sheeting thereof and directing said pieces of dough on a defined path into said curling means, comprising a pair of relatively adjustable sheeting rollers, one of said rollers mounted in spaced relation above said conveyor belt being flanged and the other of said rollers fitting between the flanges of said flanged roller to define a dough passage therebetween having its side margins fixed relative to the longitudinal marginal edges of said conveyor belt.

2. In a bread molding machine, means for feeding sheeted dough pieces from a sheeting mechanism to a curling conveyor belt, comprising conveying means operating in the same direction as said curling conveyor belt, feeding means operating crosswise of said conveying means discharging sheeted dough pieces from said sheeting mechanism crosswise onto said conveying means, and a pair of rollers interposed between said conveying means and said curling conveyor belt in a position to receive sheeted dough pieces from said conveying means, said rollers being mounted over said curling conveyor belt and being spaced to define a passage between the same opening downwardly onto said curling conveyor belt, said rollers having cooperating rolling surfaces of a configuration to define the width of said passage and locate said dough pieces transversely of said curling conveyor belt.

3. In a bread molding machine, means for feeding sheeted dough pieces from a sheeting mechanism to a curling conveyor belt, comprising conveying means operating in the same direction as and having its discharge end over said curling conveyor belt, feeding means operating crosswise of said conveying means discharging sheeted dough pieces from said sheeting mechanism crosswise onto said conveying means, and means for rolling said dough pieces to a uniform thickness and locating the same transversely of said curling conveyor belt interposed between the discharge end of said conveying means and said curling conveyor belt in a position to receive sheeted dough pieces from said conveying means and discharge the same onto said curling conveyor belt, comprising a pair of cooperating rollers mounted over said curling conveyor belt and spaced to define a passage between the same opening downwardly onto said curling conveyor belt, one of said rollers being flanged and the other roller fitting between the flanges of said flanged roller, and means for adjusting the spacing of said rollers.

MERLIN A. STICELBER.

References Cited in the file of this patent

UNITED STATES PATENTS

| Number | Name | Date |
|---|---|---|
| 806,869 | Burns | Dec. 12, 1905 |
| 1,792,443 | Peters | Feb. 10, 1931 |
| 1,949,105 | Lauterbur et al. | Feb. 27, 1934 |
| 2,323,537 | Harber | July 6, 1943 |
| 2,479,864 | Rhodes | Aug. 23, 1949 |

FOREIGN PATENTS

| Number | Country | Date |
|---|---|---|
| 21,480 | France | July 6, 1920 |
| 501,285 | France | Jan. 21, 1920 |